United States Patent [19]

Gardner

[11] Patent Number: 4,685,368
[45] Date of Patent: Aug. 11, 1987

[54] BAND SAW JOINT

[76] Inventor: Dennis S. Gardner, 955 - 50B Street, Delta, British Columbia, Canada, V4M 2V8

[21] Appl. No.: 715,289

[22] Filed: Mar. 25, 1985

[51] Int. Cl.⁴ .................. B23D 61/12; B27B 33/06
[52] U.S. Cl. ............................. 83/661; 83/835; 403/341; 403/381; 474/253
[58] Field of Search ............... 83/661, 835; 24/617, 24/171, 181, 31 L; 403/341, 381, 339; 474/253, 256, 257

[56] References Cited

U.S. PATENT DOCUMENTS

| | | | |
|---|---|---|---|
| 161,263 | 3/1875 | Newhall | 83/661 |
| 230,934 | 8/1880 | Gale et al. | 83/661 |
| 554,803 | 2/1896 | Tiemann | 24/31 L |
| 837,439 | 12/1906 | Wallace . | |
| 853,282 | 5/1907 | Wallace . | |
| 1,013,469 | 1/1912 | Aufinson | 24/31 L |
| 1,306,741 | 6/1919 | Blanchard . | |

Primary Examiner—E. R. Kazenske
Assistant Examiner—Eugenia A. Jones
Attorney, Agent, or Firm—Carver & Co.

[57] ABSTRACT

The invention provides a disconnectable band saw joint assembly for connecting together in axial alignment end portions of a bandsaw. The joint assembly does not require welding, and as such can be easily separated to permit threading of the bandsaw through a hole drilled in a plate to permit sawing of a closed ended cut or loop within the plate. This eliminates the normal practice of breaking and rewelding a band saw for cutting a closed loop within a plate. Furthermore, because the joint is cold, it does not affect temper of the saw portions adjacent the joint. The assembly has male and female connections, the female connections having a neck recess and a head recess, and the male connection having a head portion and a neck portion which fit within the neck recess and the head recess respectively. The recess has at least one main recess edge, and the head portion has at least one main head edge, both edges being disposed normally to longitudinal axis of the saw. When the jaw joint is under tension, the main head edge is in direct edge-to-edge contact with the main recess edge to permit limited hinging between the end portions about a main hinge axis coincident with the main edges and disposed normally to the saw axis.

17 Claims, 5 Drawing Figures

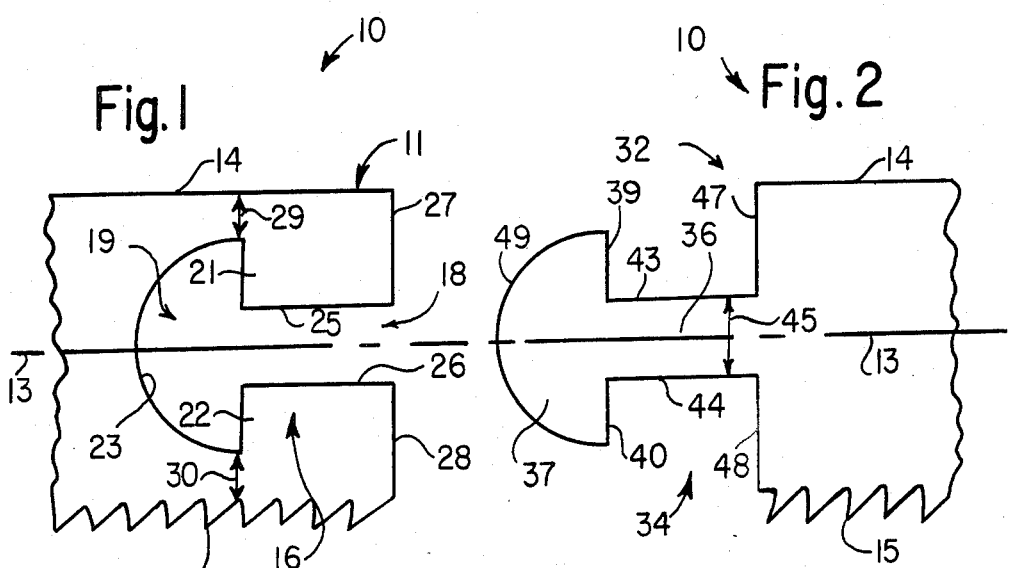
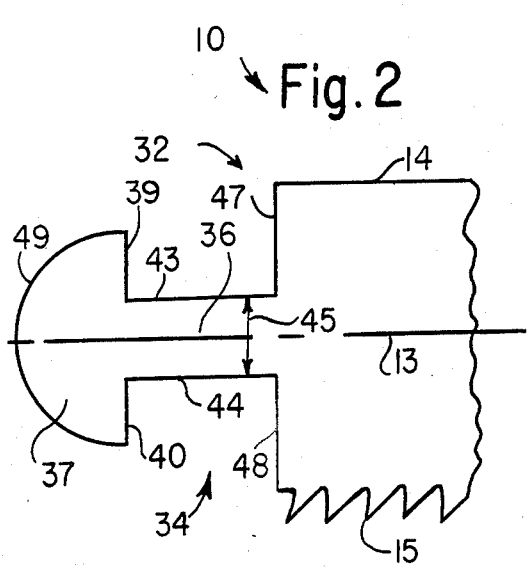
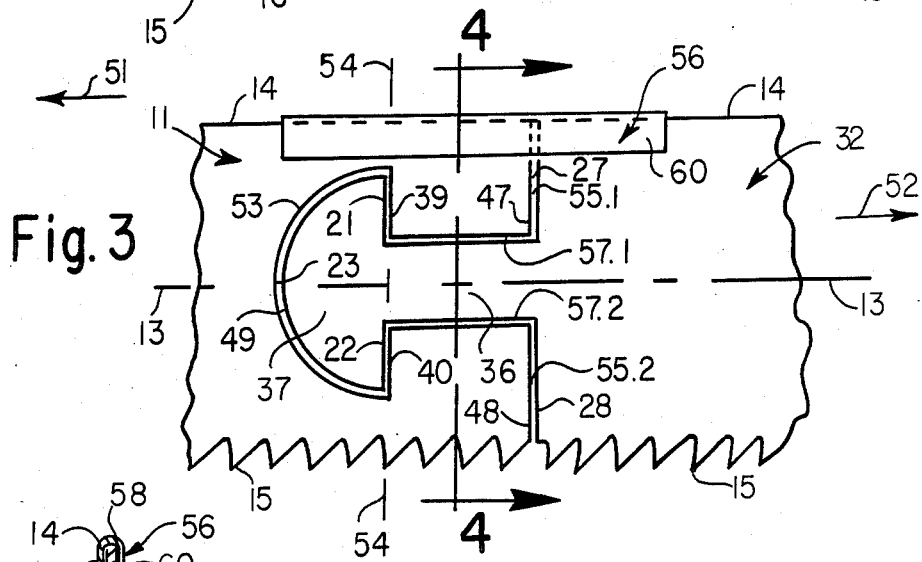
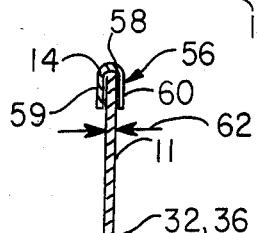
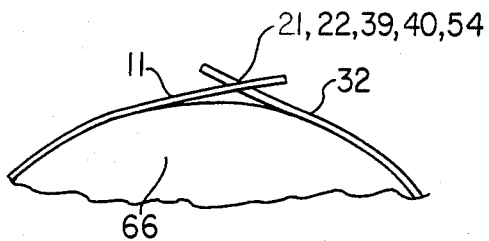

BAND SAW JOINT

BACKGROUND OF THE INVENTION

1. Field of the Invention

The invention relates to a bandsaw joint assembly for connecting together end portions of a band saw to form a loop, without requiring conventional welding.

2. Prior Art

Bandsaw apparatus have been used for many years and normally include a pair of spaced co-planar wheels carrying an endless loop of bandsaw. The saw has a longitudinal axis disposed between spaced parallel marginal edges of the saw, and at least one marginal edge has saw teeth, although commonly both edges are provided with saw teeth. The saw itself is usually fabricated from a toothed strip of metal which is cut to the required length, and adjacent end portions are then welded together, commonly using a butt welding process. Any irregularities at the weld itself are usually ground away to provide a relatively smooth joint. The heat of the welding process necessarily changes the temper of the saw material adjacent the weld, thus adversely affecting its wear and toughness characteristics. Also, the joint itself is rarely perfect and usually causes an undesirable "click" as it passes over the wheels carrying the saw for each revolution of the saw itself. It is difficult for a skilled welder to produce a joint in the saw which does not adversely affect the sawing performance at the saw joint.

There have been various attempts to reduce the difficulties of connecting together ends of bandsaws using a non-welding process as follows. U.S. Pat. Nos. 161,263 (Newhall) and 230,934 (Gale and Wright) both disclose cold bandsaw connections which require precision forming of adjacent end portions of the saw to permit the end portions to overlap each other to form the joint. Parts of the overlapping end portions have been thinned to one half of the original saw thickness to maintain normal thickness of the saw, but this weakens the joint. U.S. Pat. No. 361,536 (Miller) discloses a cold joint for adjacent ends of a bandsaw which resembles a conventional "dovetail" wood joint. While this does not require overlapping, it would require considerable forming skills. Applicant considers that all three joints shown in the above patents would present considerable difficulties when the saw joint passes over a normal size wheel mounting the saw. There have been various attempts to provide joints between adjacent sectors of circular saws, and portions of manual crosscut saws, but most of these result in relatively complex connections, requiring high precision joints and various fastening means which would be difficult to incorporate in the relatively thin band saw material used by hobbyists or small machine shops.

SUMMARY OF THE INVENTION

The present invention reduces the difficulties and disadvantages associated with either welded bandsaw joints, or cold bandsaw joints requiring overlapping of end portions of the saw to be joined. The invention provides a bandsaw joint assembly which is mechanically relatively simple, and accuracy of manufacturing is limited to a few specific areas requiring high tolerance, with relatively low tolerance at other areas. The invention permits the saw to pass around a relatively small wheel, during which adjacent portions of the saw are effectively hinged on each other, and bending of the saw portions is reduced. The edge portions of the saw can be quickly connected together, using a simple alignment jig which is removed once tension is applied to the saw. When it is necessary to disconnect ends of the saw, tension is removed from the saw and the end portions can be easily disconnected, and easily reconnected as many times as necessary. When in operation, the saw runs essentially silently, thus reducing the undesirable "click" commonly associated with welded joints of prior art saws.

A bandsaw joint assembly according to the invention connects together in axial alignment first and second end portions of a bandsaw to form a loop of bandsaw. The bandsaw has a longitudinal axis disposed between spaced parallel marginal edges of the saw, at least one marginal edge having saw teeth. The assembly is characterized by first and second end portions having female connecting means and male connecting means respectively. The female connecting means has a neck recess and a head recess, the recesses being so shaped and communicating with each other to provide at least one main recess edge having a thickness equal to thickness of the saw being disposed normally to the saw longitudinal axis. The female connecting means has an extreme outer end which is intersected by the neck recess so that the neck recess extends through the first end portion. The male connecting means has a neck portion and a head portion adapted to fit within the neck recess and the head recess respectively. The neck portion and the head portion are so shaped and connected together to provide at least one main head edge having a thickness equal to thickness of the saw and being disposed normally to the saw longitudinal axis. The male connecting means has an extreme outer end having the head portion which is disposed at an outer end of the neck portion. The second end portion of the saw has at least one transverse shoulder edge extending from a margin of the saw, with the neck portion extending from the shoulder edge. When the end portions are connected and the saw joint assembly is under tension, the main head edge is in direct edge-to-edge contact with the main recess edge to permit limited hinging between the end portions of the saw about a main hinge axis coincident with the main edges and disposed normally to the saw longitudinal axis.

In one embodiment, the head recess has first and second main recess edges which are transversely aligned with each other and disposed normally to and spaced equally from the saw longitudinal axis. In this embodiment the head portion has first and second head edges which are transversely aligned with each other and disposed normally to and spaced equally from the saw longitudinal axis. Preferably the neck recess is disposed between the first and second main recess edges, and the neck portion is disposed between the first and second main head edges.

Preferably, for connecting the end portions together, an alignment means is used to engage the aligned edge portions. The alignment means temporarily holds aligned marginal edges of the male and female connections in contact, prior to applying tension to the saw. The alignment means is generally U-shaped, and has a rib portion and first and second flanges extending from the rib portion. The flanges are generally parallel to each other and spaced apart by an amount slightly greater than the thickness of the saw blade. The first and second flanges are essentially flat so as to maintain the end portions of the saw in axial alignment until tension is applied.

A detailed disclosure following, related to drawings, describes a preferred embodiment of the invention, which is capable of expression in structure other than that particularly described and illustrated.

DESCRIPTION OF THE DRAWINGS

In the drawings:

FIG. 1 is a simplified fragmented front elevation of one end portion of the saw having a female connecting means, FIG. 2 is a simplified fragmented front elevation of an opposite end portion of the saw having a male connecting means, FIG. 3 is a simplified fragmented front elevation of the saw showing the male and female connecting means cooperating with each other, and an alignment jig temporarily holding the end portions in alignment, the saw being subjected to tension, FIG. 4 is a simplified fragmented section on line 4—4 of FIG. 3, showing the saw alignment jig in engagement, FIG. 5 is an exaggerated fragmented side elevation of a portion of a wheel carrying a saw fitted with a joint assembly according to the invention, the saw joint being shown passing over the wheel while under low tension.

DETAILED DISCLOSURE

FIG. 1

A bandsaw 10 has first and second end portions, the end portion 11 being shown in FIG. 1. The bandsaw has a longitudinal axis 13 disposed between spaced parallel marginal edges of the saw, namely a rear marginal edge 14 without teeth, and a front marginal edge 15 with teeth. While the saw is shown as a single cut saw, that is with one marginal edge having teeth, clearly both edges could be provided with teeth. The first end portion 11 has a female connecting means 16 according to the invention in which the end portion 11 has been formed to provide a recess which extends longitudinally inwards and has a neck recess 18 and a head recess 19. The head recess has first and second main recess edges 21 and 22 which are transversely aligned with each other, are of equal length, and are disposed normally to and spaced equally from the saw longitudinal axis 13. Thus the neck recess is disposed between the first and second main recess edges, and is defined by spaced first and second neck recess edges 25 and 26 which intersect the first and second main recess edges of the head recess at right angles as shown. The first and second neck recess edges 25 and 26 are parallel to each other and spaced equally from the saw longitudinal axis 13. The head recess 19 has an inner edge 23 which is generally semi-circular and extends between outer ends of the main recess edges 21 and 22 so as to define the head recess as the portion of a circle. An extreme outer end of the first portion is intersected by the neck recess so that the neck recess extends from adjacent a mid-point of the extreme outer end into the first end portion. The extreme outer end has essentially equal aligned first and second transverse end edges 27 and 28 and the neck recess edges 25 and 26 extend perpendicularly from the first and second transverse edges 27 and 28 respectively. Preferably the first end portion of the saw is generally symmetrical about the longitudinal axis 13 as shown, but other arrangements are possible.

The inner edge 23 of the head recess intersects the main recess edges 21 and 22 generally at right angles as shown. Marginal portions 29 and 30 of saw material extend transversely from outer ends of the main recess edges to adjacent marginal edges 14 and 15 as shown. The sum of the widths of the marginal portions 29 and 30 represent minimum amount of saw material remaining in the first end portion which is subject to tension in the saw. Clearly, there is a limit to minimum widths of the portions 29 and 30 which must not be reduced, otherwise premature failure of the end portion would occur at these points. Such premature failure is minimized by providing fillet radii of about 0.008 inches (0.2 mm) at the intersections of the edges 21, 22 and 23. Intersections of the edges 21, 25 and 27, and the edges 22, 26 and 28 are provided with similar radii for clearance as will be described. Also, as drawn, a root 31 of a tooth is transversely aligned with the edge 22. While this is acceptable for a fine toothed saw, it should be avoided with a coarse toothed saw so as to reduce stress concentration at the portion 30.

FIG. 2

The second end portion of the saw 32 has a male connecting means 34 which is generally complementary to the female connecting means 16 of FIG. 1 to cooperate therewith to connect the end portions of the saw in alignment with each other. Also, the male and female connecting means are adapted to pass over the wheels supporting the saw, to withstand tension applied to the saw during normal operating conditions when the saw is not cutting, and also to resist lateral forces on the saw when cutting.

The male connecting means 34 has a neck portion 36 and a head portion 37, the portions 36 and 37 being adapted to fit within the neck recess 18 and head recess 19 respectively of the first portion. The head portion has first and second main head edges 39 and 40 which are transversely aligned with each other and disposed normally to and spaced equally from the saw longitudinal axis 13. It can be seen that the neck portion 36 is disposed between and extends from the first and second main head edges 39 and 40, and is defined by spaced first and second neck portion edges 43 and 44 which intersect the first and second main head edges 39 and 40 perpendicularly. The second end portion has an extreme outer end having the head portion which is disposed at an outer end of the neck portion. Preferably, the second end portion is generally symmetrical about the longitudinal saw axis 13 and has first and second transverse shoulder edges 47 and 48 which extend perpendicularly from the neck portion edges 43 and 44 to respective adjacent margins 14 and 15 of the saw. The first and second neck portion edges 43 and 44 are parallel to each other and spaced equally from the saw longitudinal axis 13. The first and second head edges 39 and 40 are connected by a generally semicircular outer edge 49 and are of equal length, which is slightly less than length of the main recess edges 21 and 22.

The neck portion 36 has a neck width 45 which represents minimum width of saw material at the second edge portion 36 which is subject to tension of the saw. Similarly to the edge portions 29 and 30 of FIG. 1, the neck portion 45 has a minimum width which can not be reduced, otherwise premature failure could occur at the neck portion, either where it joins the head edges 39 and 40, or the shoulder edges 47 and 48. Chances of premature failure at these intersections are reduced by providing suitable fillet radii of about 0.008 inches (0.2 mm) at the intersections of the edges 39, 43 and 47, and 40, 44 and 48. Somewhat larger fillet radii of about 0.010 inches (0.25 mm) are provided at intersections of the edges 39, 40 and 49. The width 45 is about 0.063 inches (1.6 mm) for a saw of nominal width of 0.375 inches (9.5 mm), and approximately equal to the sum of the widths of the marginal portions 29 and 30 of FIG. 1 so that strengths of the end portions are approximately equal.

FIGS. 3 and 4

In FIG. 3, the first end portion 11 is subjected to tension in direction of an arrow 51 and the second end portion 32 is subjected to tension in direction of an arrow 52, which represents typical conditions of forces within the saw when in normal operating condition, without cutting. In this condition, that is when the saw joint assembly is under tension, the main head edges 39 and 40 are in direct edge-to-edge with the main recess edges 21 and 22 respectively. When under tension, preferably the teeth of the edge 15 on the portion 11 are "in phase" with teeth on the aligned edge 15 of the portion 32. That is the teeth on either side of the joint are spaced at the same pitch as adjacent teeth, although this does not appear to be very critical in practice. The head and neck recesses, and the head and neck portions 37 and 36 are so shaped that these two pairs of main edges 21, 39 and 22, 40 are the only edges that are in intimate contact with each other when the saw is under tension. Sufficient clearance is provided between other adjacent edges and fillet radii to permit limited hinging between the end portions of the saw about a main hinge axis 54. The axis 54 is coincident with the main edges when the main edges are in contact with each other and is disposed normally to the saw longitudinal axis.

When the saw is under tension as shown, it can be seen that a radial clearance 53 exists between inner edge 23 of the neck recess, and outer edge 49 of the head portion. This can be in the order of about 0.003 inches (0.08 mm). Similarly, when the saw is under tension, there are longitudinal clearances 55.1 and 55.2 between the edges 27 and 47, and the edges 28 and 48, which similarly can be of the order of about 0.003 inches (0.08 mm). It is added that the edges 27 and 28, and 47 and 48 do not necessarily have to be perpendicular to the axis 13. Provided there is no interference between these edges when the saw is under tension, the angles of these edges are relatively immaterial.

Similarly, when the saw portions are interconnected, transverse clearances 57.1 and 57.2 exist between edges of the neck recess, and complementary adjacent edges of the neck portion. This clearance can be in the order of about 0.0002 inches (0.005 mm), so as to reduce, or essentially prevent any relative lateral movement between the saw portions, i.e. transverse movement relative to the longitudinal axis 13.

Clearly, the intimate contact between the main head edges and the main recess edges requires accurate control of the actual bearing surfaces of these edges. In effect, these main edges "rock" about each other as the saw passes over the wheels driving the saw and clearly these edges must be flat and be right angles to the longitudinal axis of the saw. Furthermore, the actual edge faces or bearing surfaces of the saw must be flat and at right angles to the broad faces of the saw so as to reduce any tendency of lateral shifting between these edges. Sophisticated manufacturing techniques might be required to maintain these tolerances, and the inventor has found that an EDM (Electrical Discharge Machining) wire cutting process has been successful when used with relatively small bandsaws as used by hobbyists. Clearly, this method of manufacturing produces a main recess edge and a main head edge which have a thickness equal to thickness of the saw, which provides a simple butt joint permitting intimate or direct edge-to-edge contact.

To facilitate initial alignment of the edge portions of the saw as shown in FIG. 3, an alignment jig or mean 56 is used as follows. The alignment means is generally U-shaped as shown in FIG. 4, and has a rib portion 58 disposed between first and second flanges 59 and 60 which extend from the rib portion. The flanges are generally parallel to each other and spaced apart by an amount slightly greater than thickness of the saw blade, designated 62, which is about 0.025 inches (0.63 mm). The first and second flanges are essentially flat so as to maintain the end portions of the saw in axial alignment until tension is applied, and can be fitted easily over the edge 14 of the saw. The alignment means is thus adapted to engage aligned edge portions of the first and second end portions adjacent the joint, so as to temporarily hold the main edges of the male and female connection means in contact prior to applying tension. It has been found that only one alignment jig is required for a normal saw, and this is temporarily fitted most easily adjacent the rear edge of the saw without teeth, so as to overcome the problems of set of teeth.

As previously stated, in FIG. 3 the teeth 15 of the saw on each portion are shown to be spaced equally apart across the joint itself. This would likely be more critical with a saw having coarse teeth, and require accurate positioning of jigs, not shown, which cut the connecting means at the ends of the saws. With fine teeth it does not appear to be critical.

FIG. 5

A wheel 66 is shown carrying the joint of the saw, which is shown essentially under low tension, with relative dimensions being exaggerated for clarity to show separation of end portions of the saw from the wheel. Clearly, under normal operating tension, the end portions 11 and 32 of the saw would curve to conform more closely to the periphery of the wheel. When under low tension as shown, it can be seen that the main recess edges 21 and 22 and the main head edges 39 and 40 are in intimate contact, with extreme outer portions of the end portions extending beyond the axis 54. When normal tension is applied to the saw, the end portions bend and are drawn closely adjacent the periphery of the saw. Also slight rocking of the end portions about the main hinge axis occurs as the saw passes onto the wheel from an unsupported straight aligned position between the wheels, and similarly, rocking at the joint occurs as the joint leaves the wheel.

OPERATION

In operation, the saw, with ends disconnected, is passed over the two wheels, and the end portions are positioned closely together, between the wheels so as to be unsupported. The head portion and neck portion of the male connecting means is passed laterally into the head recess and neck recess respectively of the female connecting means. When the connecting means are held between one finger and thumb, the alignment means can be quickly slipped over the rear edge 14 of the blade, and then tension can be applied to the saw by moving the wheels slightly further apart. When sufficient or normal tension has been applied to the saw, the alignment means can be moved, and the two end portions are then in intimate engagement and are capable of resisting normal lateral forces imposed on the saw. Furthermore, when the joint passes over the wheels, the usual click associated with welded joints is essentially eliminated.

Ends of the saw can be easily connected by merely reducing tension on the saw, which permits the male and female portions to be separated by moving ends portions of the saw laterally apart.

Examples of this invention applied to a nominal ⅜ inch wide (9.5 mm) hobbyist's saw have been used successfully to cut a wide variety of materials such as thin sheet aluminum, plastic, plywood etc. Difficulties may be expected when cutting wood or metals thicker than 1½ inch (i.e. 38 mm).

ALTERNATIVES AND EQUIVALENTS

The invention as disclosed has a head recess which has two transversely aligned main recess edges which cooperate with the head portion which has two transversely aligned main head edges i.e., there is intimate contact between two transversely spaced contact areas. This is an important feature of the invention, and the resulting symmetry of the joint is also considered important. The use of two transversly spaced areas of contact which are also spaced equally on each side of the axis of the saw is considered to be more reliable than one area of contact, particularly for the relatively thin hobbyist saw. Also, lateral forces on the saw during cutting are resisted by contact been a neck recess edge and an adjacent neck portion edge. This interference prevents lateral disengagement of the portions.

However, alternate shapes of recesses are possible and the invention is not limited to the particular shapes described. For example, the edge 23 and 49 do not need to be semi-circular. In some arrangements, the recesses could be so shaped as to communicate with each other to provide one main recess edge disposed normally to the saw longitudinal axis. Similarly, the neck portion and head portion could be so shaped and connected together to provide one main head edge disposed normally to the saw longitudinal axis. Such an arrangement may not have the symmetry or reliability of the invention as disclosed, but it is considered that alternative arrangements could provide a similar joint which permits hinging or rocking between the end portions of the saw about a main hinge axis which is coincident with the main edges and disposed normally to the saw longitudinal axis.

I claim:
1. A bandsaw assembly having:
   (a) a longitudinal axis disposed between spaced parallel marginal edges of the saw, at least one marginal edge having saw teeth,
   (b) a first end portion having a terminal edge and a female connecting means having a neck recess and a head recess, the recesses extending through the thickness of the saw and being so shaped and communicating with each other as to provide at least one main recess edge having a thickness equal to the thickness of the saw and being disposed normally to the saw longitudinal axis, the female connecting means having an extreme outer end provided by said terminal edge which is intersected by the neck recess so that the neck recess extends through the first end portion to said terminal edge,
   (c) a second end portion including a terminal edge from which a male connecting means extends, said male connecting means having a neck portion and a head portion adapted to fit within the neck recess and the head recess respectively of the first end portion, the neck portion and the head portion being so shaped and connected together to provide at least one main head edge having a thickness equal to the thickness of the saw and being disposed normally to the saw longitudinal axis, the male connecting means having an extreme outer end having the head portion which is disposed at an outer end of the neck portion, engagement of said main recess edge with said main head edge forms a hinge joint permitting hinging of said first and second portions thereabout when the bandsaw assembly is under tension.

2. A bandsaw assembly as claimed in claim 1 including:
   (a) the head recess having first and second main recess. edges which are transversely aligned with each other and disposed normally to and spaced equally from the saw longitudinal axis,
   (b) the head portion having first and second main head edges which are transversely aligned with each other and disposed normally to and spaced equally from the saw longitudinal axis.

3. A bandsaw assembly as claimed in claim 2 further characterized in that:
   (a) the neck recess is disposed between the first and second main recess edges,
   (b) the neck portion is disposed between the first and second main head edges.

4. A bandsaw assembly as claimed in claim 2 in which:
   (a) the neck recess is defined by spaced first and second neck recess edges which intersect the first and second main recess edges of the head recess,
   (b) the neck portion is defined by spaced first and second neck portion edges which intersect the first and second main head edges.

5. A bandsaw assembly as claimed in claim 4, in which:
   (a) the first end portion of the saw is generally symmetrical about the longitudinal saw axis, so that the neck recess extends from aligned first and second transverse end edges,
   (b) the second end portion of the saw is generally symmetrical about the longitudinal saw axis, and the first and second shoulder edges extend from the neck portion to respective adjacent marginal edges of the saw.

6. A bandsaw assembly as claimed in claim 4 in which:
   (a) the first and second neck recess edges are parallel to each other and spaced equally from the saw longitudinal axis, and the head recess has first and second main recess edges which are of equal length, and are transversely aligned with each other and disposed normally to the saw longitudinal axis,
   (b) the first and second neck portion edges are parallel to each other and spaced equally from the saw longitudinal axis, the head portion having first and second head edges which are of equal length and are transversely aligned with each other and disposed normally to the saw longitudinal axis.

7. A bandsaw assembly as claimed in claim 1 further including:
(a) a detachable alignment means adapted to engage aligned marginal edges of the first and second end portions adjacent the joint, so as to temporarily hold the main edges of the male and female connection means in contact with each other, prior to applying tension to the saw.

8. A bandsaw assembly as claimed in claim 7 further characterized in that:
(a) the alignment means is generally U-shaped, and has a rib portion and first and second flanges, the flanges being generally parallel to each other and spaced apart by an amount slightly greater than thickness of the saw blade, the first and second flanges being essentially flat so as to maintain the end portions of the saw in axial alignment until tension is applied.

9. A bandsaw assembly as claimed in claim 2 including:
(a) the first end portion having marginal portions of the saw extending transversely from outer ends of the main recess edges to adjacent marginal edges of the saw,
(b) the neck portion of the second end portion having a transverse width approximately equal to sum of the marginal portions of the first portion.

10. A bandsaw assembly as claimed in claim 6 including:
(a) the first end portion having marginal portions of the saw extending tranvsersely from outer ends of the main recess edges to adjacent marginal edges of the saw,
(b) the neck portion has a transverse width defined by space between the neck portion edges, the width being approximately equal to sum of the marginal portions of the first portion.

11. A disengageable bandsaw assembly, comprising:
(a) a longitudinally extending saw body including first and second terminal edges at opposite ends thereof;
(b) female connecting means operably associated with said first terminal edge and including a slot portion extending through said body and longitudinally from said first edge and terminating in a contoured portion having at least a first shoulder edge extending normal to and from said slot portion; and,
(c) male connecting means operably associated with said second terminal edge and including a neck portion extending from said second terminal edge and being sized for receipt within said slot portion and terminating in a head portion having at least a second shoulder edge extending normal to and from said neck portion, engagement of said first and second shoulder edges forms a hinge joint permitting hinging of said male and female connecting means thereabout when said bandsaw assembly is under tension.

12. The assembly of claim 11, wherein:
(a) a third shoulder edge extending normal to and from said slot portion;
(b) a fourth shoulder edge extending normal to and from said neck portion; and,
(c) said third and fourth shoulder edges extending toward a first marginal edge of said body and said first and second shoulder edges extending toward a second marginal edge of said body.

13. The assembly of claim 12, wherein:
(a) said contoured and head portions being semicircular.

14. The assembly of claim 12, wherein:
(a) said neck portion having a width less than the width of said slot portion for providing a clearance therewith when said assembly is under tension.

15. The assembly of claim 12, wherein:
(a) said body having a longitudinal axis; and,
(b) said neck portion and said slot portion being coaxial with said body axis.

16. The assembly of claim 14, wherein:
(a) said neck portion having a length in excess of the length of said slot portion for providing a clearance between said terminal edges when said assembly is under tension.

17. The assembly of claim 16, wherein:
(a) a plurality of teeth extending along at least one of said marginal edges.

* * * * *